United States Patent [19]
Park et al.

[11] Patent Number: 5,854,755
[45] Date of Patent: Dec. 29, 1998

[54] CLOCK FREQUENCY MULTIPLICATION DEVICE

[75] Inventors: Heung-Ok Park, Yuson-ku; Dong-Geun Kim, Daejeon, both of Rep. of Korea

[73] Assignee: Electronics and Telecommunications Research Institute, Daejeon, Rep. of Korea

[21] Appl. No.: 708,681

[22] Filed: Sep. 5, 1996

[30] Foreign Application Priority Data

Dec. 20, 1995 [KR] Rep. of Korea ........................ 95-52649

[51] Int. Cl.$^6$ .................................................. G06F 7/68
[52] U.S. Cl. .............................................. 364/703; 377/47
[58] Field of Search ............................. 364/703; 377/47, 377/48, 49

[56] References Cited

U.S. PATENT DOCUMENTS

| | | | |
|---|---|---|---|
| 3,970,954 | 7/1976 | Even | 364/703 |
| 4,244,027 | 1/1981 | Shai | 364/703 |
| 4,773,031 | 9/1988 | Tobin | 364/703 |
| 4,956,797 | 9/1990 | Berard | 364/703 |
| 5,422,835 | 6/1995 | Houle | 364/703 |
| 5,719,510 | 2/1998 | Weidner | 377/47 |

*Primary Examiner*—David H. Malzahn
*Attorney, Agent, or Firm*—Nixon & Vanderhye P. C.

[57] ABSTRACT

A clock frequency multiplication device comprising a first multiplier for generating an oscillating frequency every first half of a period of an input clock signal where the input clock signal is high in logic, counting the oscillating frequency, dividing the resultant count data at a division ratio of $1/2^n$, where n is a natural number, providing the divided count data as a preset signal and down counting the count data in response to the preset signal to multiply the frequency of the input clock signal by a desired number for the first half of the period of the input clock signal, a second multiplier for multiplying the frequency of the input clock signal by the desired number for the latter half of the period of the input clock signal where the input clock signal is low in logic, in the same manner as that of the first multiplier, a control unit for controlling the first and second multipliers in such a manner that they can be operated for the opposite halves of the period of the input clock signal and setting the division ratio of the first and second multipliers to control a multiplication ratio thereof, and an output stage for mixing output signals from the first and second multipliers and outputting the mixed result as a multiplied frequency clock signal.

16 Claims, 3 Drawing Sheets

INPUT CLOCK SIGNAL

2X INPUT CLOCK SIGNAL

4X INPUT CLOCK SIGNAL

8X INPUT CLOCK SIGNAL

CLOCK FREQUENCY MULTIPLICATION DEVICE

BACKGROUND OF THE INVENTION

1. Field of the Invention

The present invention relates in general to clock frequency multiplication devices, and more particularly to a clock frequency multiplication device for multiplying the frequency of an input clock signal by $2^n$ in a digital circuit to obtain a higher frequency output, where n is a natural number.

2. Description of the Prior Art

Generally, most of digital circuits are operated synchronously with an input clock signal. As needed, the digital circuits divide the frequency of the input clock signal by 2, 3, etc. to obtain a lower frequency clock signal. However, it is uncommon that the digital circuits multiply the frequency of the input clock signal to obtain a higher frequency clock signal. For this reason, in most cases, the input clock signal has the highest frequency among operating signals in the digital circuits.

Also in the digital circuits, an internal logic state is varied with a variation of an external input logic state. As a result, the internal logic state cannot change for a time period that the input clock signal with the highest frequency remains at its 1 (high) or 0 (low) logic state.

The input clock signal is used in common in a system including a plurality of digital circuits. However, some specific digital circuits in the system may require a clock signal with a higher frequency than that of the input clock signal. In this case, it is unreasonable that the system provides another of the higher frequency clock signal separately. There are rare the circuits which produce a multiplied frequency of clock signal only by pure digital gates and requires no other switch or delay elements.

SUMMARY OF THE INVENTION

Therefore, the present invention has been made in view of the above problem, and it is an object of the present invention to provide a clock frequency multiplication device for multiplying the frequency of an input clock signal by $2^n$ such as 2, 4, 8, 16, etc. in a digital circuit to obtain a higher frequency output, where n is a natural number.

In accordance with the present invention, the above and other objects can be accomplished by a provision of a clock frequency multiplication device comprising first multiplication means for generating an oscillating frequency every the first half of a period of an input clock signal where the input clock signal is high in logic, counting the oscillating frequency, dividing the resultant count data at a division ratio of $1/2^n$, where n is a natural number, providing the divided count data as a preset signal and down counting the count data in response to the preset signal to multiply the frequency of the input clock signal by a desired number for the first half of the period of the input clock signal; second multiplication means for multiplying the frequency of the input clock signal by the desired number for the latter half of the period of the input clock signal that the input clock signal is low in logic, in the same manner as that of the first multiplication means; control means for controlling the first and second multiplication means in such a manner that they can be operated for the opposite halves of the period of the input clock signal and setting the division ratio of the first and second multiplication means to control a multiplication ratio thereof; and output means for mixing output signals from the first and second multiplication means and outputting the mixed result as a multiplied frequency clock signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
FIG. 1 is a waveform diagram illustrating a given input clock signal and clock signals obtained by multiplying the frequency of the given input clock signal in accordance with the present invention.
Figure 1:
Figure 1:
Figure 1:
Figure 2:
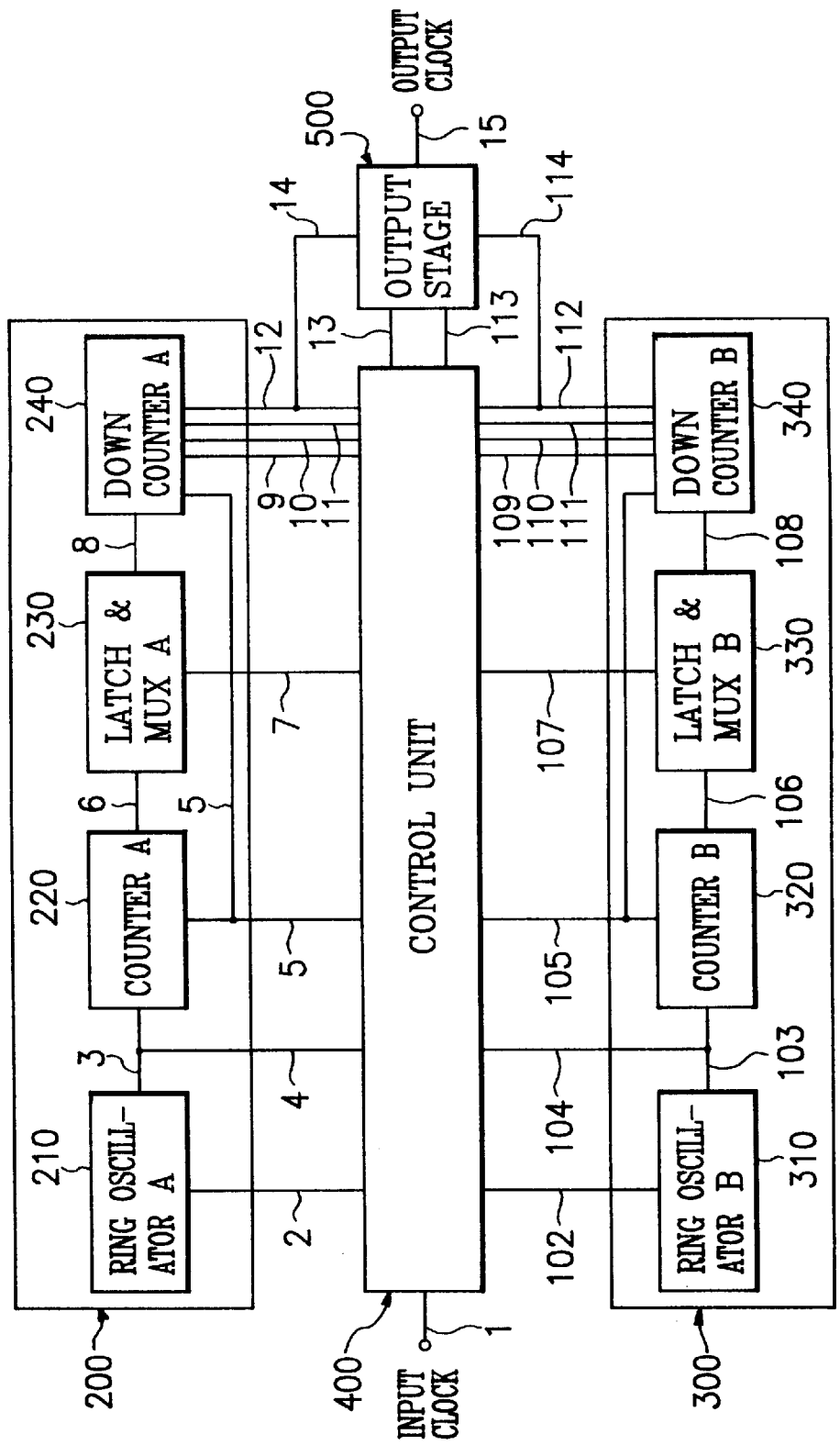
FIG. 2 is a block diagram illustrating the construction of a clock frequency multiplication device in accordance with the present invention.

FIG. 1 is a waveform diagram illustrating a given input clock signal and clock signals obtained by multiplying the frequency of the given input clock signal in accordance with the present invention and FIG. 2 is a block diagram illustrating the construction of a clock frequency multiplication device in accordance with the present invention. As shown in FIG. 2, the clock frequency multiplication device comprises a first multiplier 200 for generating an oscillating frequency every first half of a period of an input clock signal where the input clock signal is high in logic. The first multiplier 200 counts the oscillating frequency and divides the resultant count data at a division ratio of $1/2^n$ such as 1/2, 1/4, 1/8, etc., where n is a natural number. Then, the first multiplier 200 provides the divided count data as a preset signal and down counts the count data in response to the preset signal. In this manner, the first multiplier 200 multiplies the frequency of the input clock signal by a desired number for the first half of the period of the input clock signal.

The clock frequency multiplication device further comprises a second multiplier 300 for multiplying the frequency of the input clock signal by the desired number for the latter half of the period of the input clock signal where the input clock signal is low in logic, in the same manner as that of the first multiplier 200, and a control unit 400 for controlling the first and second multipliers 200 and 300 in such a manner that they can be operated for the opposite halves of the period of the input clock signal. The control unit 400 also sets the division ratio of the first and second multipliers 200 and 300 to control a multiplication ratio thereof.

The clock frequency multiplication device further comprises an output stage 500 for mixing output signals from the first and second multipliers 200 and 300 and outputting the mixed result as a multiplied frequency clock signal.

The first multiplier 200 includes a first ring oscillator A 210 for generating the oscillating frequency every first half of the period of the input clock signal there the input clock signal is high in logic, a first counter A 220 for counting an output signal from the first ring oscillator A 210, a first latch/multiplexer circuit A 230 for latching an output signal from the first counter A 220 for the latter half of the period of the input clock signal where the input clock signal is low in logic and dividing the latched signal at the division ratio of $1/2^n$, and a first down counter A 240 for receiving an output signal from the first latch/multiplexer circuit A 230 as the preset signal and down counting the output signal from the first ring oscillator A 210 in response to the received preset signal to multiply the frequency of the input clock signal by the desired number for the first half of the period of the input clock signal and to generate the multiplied result as a carry.

The second multiplier 300 includes a second ring oscillator B 310 for generating the oscillating frequency every the latter half of the period of the input clock signal where input clock signal is low in logic, a second counter B 320 for counting an output signal from the second ring oscillator B 310, a second latch/multiplexer circuit B 330 for latching an output signal from the second counter B 320 for the first half of the period of the input clock signal where the input clock signal is high in logic and dividing the latched signal at the division ratio of $1/2^n$, and a second down counter B 340 for receiving an output signal from the second latch/multiplexer circuit B 330 as the preset signal and down counting the output signal from the second ring oscillator B 310 in response to the received preset signal to multiply the frequency of the input clock signal by the desired number for the latter half of the period of the input clock signal and to generate the multiplied result as a carry.

The control unit 400 is adapted to perform a timing control operation in such a manner that the first and second multipliers 200 and 300 can multiply the frequency of the input clock signal by the desired number for the opposite halves of the period of the input clock signal. The control unit 400 also applies the output signal from the ring oscillator to a count input terminal of the down counter, an inverted one of the input clock signal to a count prevention input terminal of the down counter and the carry from the down counter to a data load input terminal of the down counter, respectively.

The output stage 500 is adapted to OR the output signals from the first and second multipliers 200 and 300 and to output the ORed result as the multiplied frequency clock signal.

The operation of the clock frequency multiplication device with the above-mentioned construction in accordance with the present invention will hereinafter be described in detail with reference to FIG. 3.

Figure 3:
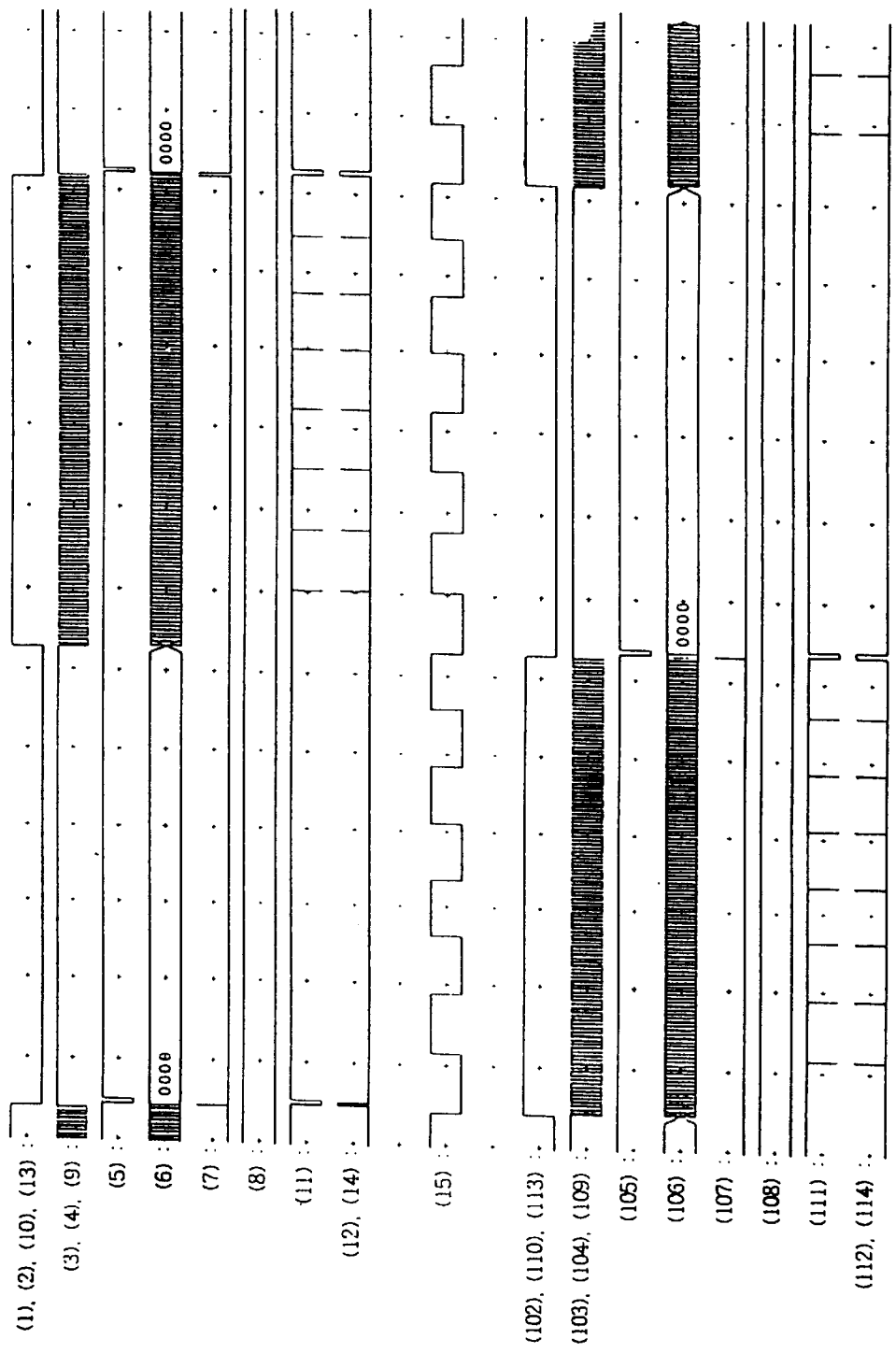
FIG. 3 is a timing diagram illustrating the operation of the clock frequency multiplication device which multiplies the frequency of the given input clock signal by 8 in accordance with the present invention.

FIG. 3 is a timing diagram illustrating the operation of the clock frequency multiplication device which multiplies the frequency of the given input clock signal by 8 in accordance with the present invention. In this drawing, the reference numeral 1 designates the input clock signal which is applied to the control unit 400.

The reference numeral 2 designates the input clock signal which is applied to the first ring oscillator A 210. The first ring oscillator A 210 generates the oscillating frequency when the input clock signal 2 is high in logic.

The reference numeral 3 designates the output signal from the first ring oscillator A 210 which is applied to the first counter A 220. The first counter A 220 counts the output signal 3 from the first ring oscillator A 210.

The reference numeral 4 designates the output signal from the first ring oscillator A 210 which is applied to the control unit 400. The control unit 400 processes the output signal 4 from the first ring oscillator A 210 to reset the second counter B 320 at the proper time.

The reference numeral 5 designates an output signal from the control unit 400 which is applied to the first counter A 220 and first down counter A 240. The control unit 400 processes the output signal from the second ring oscillator B 310 and outputs the processed signal 5 to reset input terminals of the first counter A 220 and first down counter A 240 to reset the first counter A 220 and first down counter A 240 at the proper time.

The reference numeral 6 designates the output signal from the first counter A 220 which is applied to a data input terminal of the first latch/multiplexer circuit A 230.

The reference numeral 7 designates an output signal from the control unit 400 which is applied to the first latch/multiplexer circuit A 230. The control unit 400 processes the output signal from the second ring oscillator B 310 and outputs the processed signal 7 to the first latch/multiplexer circuit A 230 to allow the first latch/multiplexer circuit A 230 to latch the output signal from the first counter A 220 at the proper time.

The reference numeral 8 designates the output signal from the first latch/multiplexer circuit A 230 which is applied as the preset signal to the first down counter A 240. The first latch/multiplexer circuit A 230 latches the output signal from the first counter A 220 and divides the latched signal at the division ratio such as 1/2, 1/4, 1/8, 1/16, etc. Then, the first latch/multiplexer circuit A 230 outputs the resultant signal 8 to a data input terminal of the first down counter A 240.

The reference numeral 9 designates the output signal from the first ring oscillator A 210 which is applied to the first down counter A 240.

The reference numeral 10 designates the input clock signal which is applied to the first down counter A 240. The input clock signal 10 is applied to a count control input terminal of the first down counter A 240 to allow the first down counter A 240 to perform the down counting operation only while the first ring oscillator A 210 performs the oscillating operation.

The reference numeral 11 designates an output signal from the control unit 400 which is applied to the first down counter A 240. The control unit 400 processes the carry from the first down counter A 240 and outputs the processed carry 11 to a load control input terminal of the first down counter A 240 to allow the first down counter A 240 to set a down counting interval according to the multiplication ratio such as twice, four times, eight times, sixteen times, etc. while it is automatically loaded with the preset signal from the first latch/multiplexer circuit A 230. Here, the first down counter A 240 generates the carry when output data therefrom are all 0 (low) in logic.

The reference numeral 12 designates the carry from the first down counter A 240 which is applied to the control unit 400 and the output stage 500.

The reference numeral 13 designates the input clock signal which is applied to the output stage 500. The input clock signal 13 is applied to the output stage 500 to reset a part of the output stage 500 while the first ring oscillator A 210 performs no oscillating operation.

The reference numeral 14 designates the carry from the first down counter A 240 which is applied to the output stage 500.

The reference numeral 102 designates an output signal from the control unit 400 which is applied to the second ring oscillator B 310. The control unit 400 inverts a logic state of the input clock signal and outputs the inverted input clock signal 102 to the second ring oscillator B 310 to allow the second ring oscillator B 310 to perform the oscillating operation only when the input clock signal is low in logic.

The reference numeral 103 designates the output signal from the second ring oscillator B 310 which is applied to the second counter B 320. The second counter B 320 counts the output signal 103 from the second ring oscillator B 310.

The reference numeral 104 designates the output signal from the second ring oscillator B 310 which is applied to the control unit 400. The control unit 400 processes the output signal 104 from the second ring oscillator B 310 to reset the first counter A 220 at the proper time.

The reference numeral 105 designates an output signal from the control unit 400 which is applied to the second counter B 320 and second down counter B 340. The control unit 400 processes the output signal from the first ring oscillator A 210 and outputs the processed signal 105 to reset input terminals of the second counter B 320 and second down counter B 340 to reset the second counter B 320 and second down counter B 340 at the proper time.

The reference numeral 106 designates the output signal from the second counter B 320 which is applied to a data input terminal of the second latch/multiplexer circuit B 330.

The reference numeral 107 designates an output signal from the control unit 400 which is applied to the second latch/multiplexer circuit B 330. The control unit 400 processes the output signal from the first ring oscillator A 210 and outputs the processed signal 107 to the second latch/multiplexer circuit B 330 to allow the second latch/multiplexer circuit B 330 to latch the output signal from the second counter B 320 at the proper time.

The reference numeral 108 designates the output signal from the second latch/multiplexer circuit B 330 which is applied as the preset signal to the second down counter B 340. The second latch/multiplexer circuit B 330 latches the output signal from the second counter B 320 and divides the latched signal at the division ratio such as 1/2, 1/4, 1/8, 1/16, etc. Then, the second latch/multiplexer circuit B 330 outputs the resultant signal 108 to a data input terminal of the second down counter B 340.

The reference numeral 109 designates the output signal from the second ring oscillator B 310 which is applied to the second down counter B 340.

The reference numeral 110 designates the input clock signal which is applied to the second down counter B 340. The input clock signal 110 is applied to a count control input terminal of the second down counter B 340 to allow the second down counter B 340 to perform the down counting operation only while the second ring oscillator B 310 performs the oscillating operation.

The reference numeral 111 designates an output signal from the control unit 400 which is applied to the second down counter B 340. The control unit 400 processes the carry from the second down counter B 340 and outputs the processed carry 111 to a load control input terminal of the second down counter B 340 to allow the second down counter B 340 to set a down counting interval according to the multiplication ratio such as twice, four times, eight times, sixteen times, etc. while it is automatically loaded with the preset signal from the second latch/multiplexer circuit B 330. Here, the second down counter B 340 generates the carry when output data therefrom are all 0 (low) in logic.

The reference numeral 112 designates the carry from the second down counter B 340 which is applied to the control unit 400 and the output stage 500.

The reference numeral 113 designates the input clock signal which is applied to the output stage 500. The input clock signal 113 is applied to the output stage 500 to reset a part of the output stage 500 while the second ring oscillator B 310 performs no oscillating operation.

The reference numeral 114 designates the carry from the second down counter B 340 which is applied to the output stage 500.

The reference numeral 15 designates the output signal from the output stage 500. The output stage 500 performs the OR operation with respect to the output signals 14 and 114 from the first and second down counters A 240 and B 340 and outputs the ORed result 15 as the multiplied frequency clock signal. In this manner, the multiplied frequency clock signal is obtained in accordance with the present invention.

As apparent from the above description, according to the present invention, the multiplication ratio of the input clock signal can readily be adjusted on the basis of the unit length of the oscillating frequency from the ring oscillator in such a manner that the frequency of the input clock signal can be multiplied by $2^n$ such as 2, 4, 8, 16, etc. Therefore, the clock frequency multiplication device of the present invention may be used in designing an independent universal integrated circuit or an internal block in an ASIC.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A clock frequency multiplication device comprising:

first multiplication means for generating an oscillating frequency every half of a period of an input clock signal when the input clock signal is high in logic, by counting the oscillating frequency, dividing resultant count data by $2^n$, where n is a natural number, to provide divided count data as a preset signal which is down counted to multiply the frequency of the input clock signal by a desired number for said first half of the period of the input clock signal;

second multiplication means for multiplying the frequency of the input clock signal by said desired number for the latter half of the period of the input clock signal when the input clock signal is low in logic, by counting the oscillating frequency dividing the resultant count data by $2^n$, where n is a natural number to provide divided count data as a preset signal down counted to multiply the frequency of the input clock signal by said desired number which is for the latter half of the period of the input clock signal;

control means for controlling said first and second multiplication means in such a manner that they can be operated for the opposite halves of the period of the input clock signal and setting a division ratio of said first and second multiplication means ; and output means for mixing output signals from said first and second multiplication means and outputting the mixed result as a multiplied frequency clock signal.

2. A clock frequency multiplication device as set forth in claim 1, wherein said first multiplication means includes:

a ring oscillator for generating the oscillating frequency every said first half of the period of the input clock signal when the input clock signal is high in logic;

a counter for counting an output signal from said ring oscillator;

a latch/multiplexer circuit for latching an output signal from said counter for said latter half of the period of the input clock signal when the input clock signal is low in logic and dividing the latched signal by $2^n$; and a down counter for receiving an output signal from said latch/multiplexer circuit as the preset signal and down counting with the output signal from said ring oscillator in response to the received preset signal to multiply the frequency of the input clock signal by said desired number for said first half of the period of the input clock signal and to generate the multiplied result as a carry.

3. A clock frequency multiplication device as set forth in claim 1, wherein said control means is adapted to set said division ratio of said first and second multiplication means in such a manner that said output means can output a clock signal obtained by multiplying the frequency of the input clock signal by $2^n$, where n is a natural number.

4. A clock frequency multiplication device as set forth in claim 1, wherein said output means is adapted to perform an OR operation with respect to the output signals from said first and second multiplication means and to output the ORed result as the multiplied frequency clock signal.

5. A clock frequency multiplication device comprising:

first multiplication means for generating an oscillation frequency every half of a period of an input clock signal when the input clock signal is high in logic, counting the oscillating frequency to produce a counted number, dividing the counted number by a desired number of $2^n$ to produce a divided number, where n is a natural number, latching and providing the divided number as a preset number to a down counter, down counting the preset number by said oscillation frequency until a borrow signal is generated, reloading the divided number again as the preset number of down counter and repeating down counting until said desired number of borrow signals are generated, and thus said desired number of borrow signal pulses can be obtained during a first half of input clock signal period, second multiplication means for generating said oscillation frequency every half of a period of an input clock signal when the input clock signal is low in logic, counting the oscillating frequency to produce a counted number, dividing the counted number by a desired number of $2^n$ to produce a divided number, where n is a natural number, latching and providing the divided number as a preset number to a down counter, down counting the preset number by said oscillation frequency until a borrow signal is generated, reloading the divided number again as the preset number of down counter and repeating down counting until said desired number of borrow signals arc generated, and thus said desired number of borrow signal pulses can be obtained during a first half of input clock signal period, control means for controlling said first and second multiplication means in such a manner that they operate oppositely to each other, thus for the opposite halves of periods of the input clock signal respectively and setting said desired number of said first and second multiplication means to control a multiplication ratio thereof; and output means for mixing borrow signals from said first and second multiplication means and generating mixed result as a multiplied frequency signal.

6. A clock frequency multiplication device as set forth in claim 5, wherein said first multiplication means includes:

a ring oscillator for generating the oscillating frequency every said first half of a period of the input clock signal when the input clock signal is high in logic;

a counter for counting an output signal from said ring oscillator;

a latch/multiplexer circuit for latching an output signal from said counter for said another half period of the input clock signal when the input clock signal is low in logic and dividing the latched signal by said desired number of division ratio; and a down counter receiving output signals from said latch/multiplexer circuit as the preset signals and down counting by said ring oscillator output until a borrow signal is generated, and repeating to receive output signals from said latch multiplexer circuit as the preset signals and down counting by the ring oscillator output until the desired number of borrow signals obtained.

7. A clock frequency multiplication device as set forth in claim 5, wherein said control means is adapted to set said desired number of said first and second multiplication means in such a manner that said output means can output a clock signal of the multiplied frequency by the desired number $2^n$.

8. A clock frequency multiplication device as set forth in claim 5, wherein said output means is adapted to perform an OR operation with respect to the output signals from said first and second multiplication means and to output the Ored result as the multiplied frequency clock signal.

9. A clock frequency multiplication method comprising:

(a) generating an oscillating frequency every half of a period of an input clock signal when the input clock signal is high in logic, by counting the oscillating frequency, dividing resultant count data by $2^n$, where n is a natural number, to provide divided count data as a preset signal which is down counted to multiply the frequency of the input clock signal by a desired number for said first half of the period of the input clock signal;

(b) multiplying the frequency of the input clock signal by said desired number for the latter half of the period of the input clock signal when the input clock signal is low in logic, by counting the oscillating frequency dividing the resultant count data by $2^n$, where n is a natural number to provide divided count data as a preset signal down counted to multiply the frequency of the input clock signal by said desired number which is for the latter half of the period of the input clock signal;

(c) for controlling said steps (a) and (b) in such a manner that they can be operated for the opposite halves of the period of the input clock signal and setting a division ratio of said steps (a) and (b); and (d) mixing output signals from said steps (a) and (b) and outputting the mixed result as a multiplied frequency clock signal.

10. A clock frequency multiplication method as set forth in claim 9, wherein said step (a) includes:

generating the oscillating frequency with a ring oscillator every said first half of the period of the input clock signal when the input clock signal is high in logic;

counting an output signal from said ring oscillator;

latching an output signal from said counter for said latter half of the period of the input clock signal when the input clock signal is low in logic and dividing the latched signal by $2^n$; and receiving an output signal from said latching step as the preset signal and down counting with the output signal from said ring oscillator in response to the received preset signal to multiply the frequency of the input clock signal by said desired number for said first half of the period of the input clock signal and to generate the multiplied result as a carry.

11. A clock frequency multiplication method as set forth in claim 9, wherein said step (c) sets said division ratio of said steps (a) and (b) in such a manner that said step (d) outputs a clock signal obtained by multiplying the frequency of the input clock signal by $2^n$, where n is a natural number.

12. A clock frequency multiplication method as set forth in claim 9, wherein said step (d) performs an OR operation with respect to the output signals from said steps (a) and (b) and outputs the Ored result as the multiplied frequency clock signal.

13. A clock frequency multiplication method comprising:

(a) generating an oscillation frequency every half of a period of an input clock signal when the input clock signal is high in logic, counting the oscillating frequency to produce a counted number, dividing the counted number by a desired number of $2^n$ to produce a divided number, where n is a natural number, latching and providing the divided number as a preset number to a down counter, down counting the preset number by said oscillation frequency until a borrow signal is generated, reloading the divided number again as the preset number of down counter and repeating down counting until said desired number of borrow signals are generated, and thus said desired number of borrow signal pulses can be obtained during a first half of input clock signal period, (b) generating said oscillation frequency every half of a period of an input clock signal when the input clock signal is low in logic, counting the oscillating frequency to produce a counted number, dividing the counted number by a desired number of $2^n$ to produce a divided number, where n is a natural number, latching and providing the divided number as a preset number to a down counter, down counting the preset number by said oscillation frequency until a borrow signal is generated, reloading the divided number again as the preset number of down counter and repeating down counting until said desired number of borrow signals are generated, and thus said desired number of borrow signal pulses can be obtained during a first half of input clock signal period, (c) controlling said steps (a) and (b) in such a manner that they operate oppositely to each other, thus for the opposite halves of periods of the input clock signal respectively and setting said desired number to control a multiplication ratio thereof; and (d) mixing borrow signals from said steps (a) and (b) and generating mixed result as a multiplied frequency signal.

14. A clock frequency multiplication method as set forth in claim 13, wherein said step (a) includes:

generating the oscillating frequency with a ring oscillator every said first half of a period of the input clock signal when the input clock signal is high in logic;

counting an output signal from said ring oscillator;

latching an output signal from said counting step for said another half period of the input clock signal when the input clock signal is low in logic and dividing the latched signal by said desired number of division ratio; and receiving output signals from said latching step as the preset signals and down counting by said ring oscillator output until a borrow signal is generated, and repeating to receive output signals from said latch step as the preset signals and down counting by the ring oscillator output until the desired number of borrow signals is obtained.

15. A clock frequency multiplication method as set forth in claim 13, wherein said step (c) sets said desired number in such a manner that said step (d) outputs a clock signal of the multiplied frequency by the desired number $2^n$.

16. A clock frequency multiplication method as set forth in claim 13, wherein said step (d) performs an OR operation with respect to the output signals from said steps (a) and (b) outputs the ORed result as the multiplied frequency clock signal.

* * * * *